Patented Jan. 19, 1954

2,666,753

UNITED STATES PATENT OFFICE 2,666,753

STABILIZATION OF VULCANIZED COPOLYMERS OF ISOBUTYLENE

Robert L. Zapp, Somerville, N. J., assignor to Standard Oil Development Company, a corporation of Delaware No Drawing. Application March 10, 1950,
Serial No. 149,036

8 Claims. (Cl. 260—41.5)

This invention relates to cured isobutylene-diolefin copolymers of low unsaturation, relates particularly to cured and stabilized copolymers, and relates especially to cured polymers containing certain decomposable oxides and peroxides to reduce the rate of cure-reversion under the influence of heat.

It is well known that excellent high molecular weight elastomers can be prepared by copolymerization of isobutylene and a multi-olefin at temperatures below $-40°$ C. by means of a catalytic solution of aluminum chloride or similar Friedel-Crafts halide. These elastomers can be cured by sulfur, dinitroso compounds and the dioximes to yield an elastic, rubber-like material. However, this material when cured is sensitive to the effect of heat. Consequently, when exposed too long to normal curing temperatures or when heated above the normal curing temperature for more than very short periods of time, a reversion of cure or a reduction in the state of cure of the heated copolymer is likely to occur. This reversion or devulcanization significantly reduces the tensile strength and modulus of the cured polymer, increases the cold flow and sharply reduces its solvent resistance, all of which phenomena are undesirable.

According to the present invention it has now been found that the inclusion in the original compounding recipe of substantial amounts of a somewhat readily decomposable peroxide or dioxide results in a very significant and substantial reduction in the rate of reversion under heating, which greatly increases the durability of the cured copolymer under conditions of relatively high heat.

This invention is applicable to elastomers of the GR-I type. These elastomers are copolymers containing a major proportion of combined isobutylene and a minor proportion of a $C_4$ to $C_{14}$ multi-olefin, preferably a conjugated $C_4$ to $C_6$ diolefin. Isoprene is at present the most commonly used multi-olefin in the commercial manufacture, but butadiene-1,3, piperylene, 2,3-dimethylbutadiene-1,3, myrcene, and the like are also usable. Usually about 1.5 to 50, or preferably 2.5 to 10 parts by weight of diolefin are mixed with 100 parts by weight of isobutylene, and the resulting mixture is cooled to a polymerization temperature preferably between $-40°$ C. and $-103°$ C., although in some instances any temperature within the range between about $-20°$ C. and $-164°$ C., may be used. The monomers may also be diluted with a low-freezing, non-polymerizable diluent such as the various mono- or polyhalogenated alkanes, or $C_2$ to $C_5$ aliphatic hydrocarbons or carbon disulfide or the like, it being merely necessary for the diluent that it be liquid at the polymerization temperature, and non-reactive with the polymerization catalyst.

Ethylene, although an olefin, is non-reactive, and is an excellent diluent; as are ethane, propane, n-butane, i-butane, n-pentane or the like. Methyl chloride, ethyl chloride, ethylene chloride and similar fluoro-substituted alkanes which are liquid at the polymerization temperature are also useful. The cold material is then polymerized by the application thereto of a liquid Friedel-Crafts catalyst which is preferably aluminum chloride in solution in a low-freezing non-complex-forming solvent such as ethyl or methyl chloride, or carbon disulfide; or with such catalysts as aluminum bromide and aluminum chlorobromide, the light hydrocarbons such as the butanes are particularly useful solvents. The details and methods of this polymerization procedure are well shown in U. S. Patent No. 2,356,128 which is hereby incorporated into and made a part of this application.

The polymerization reaction occurs promptly and can be conducted either in a succession of batch reactions or in the form of a continuous reaction. In either case, the polymer is preferably recovered by discharging the polymerized material, usually at conversions ranging from 60% to 85% based on monomers, into warm water which volatilizes out the unpolymerized monomers and the diluent if used, and converts the polymer from a slurry in cold reactant mixture into a slurry in warm water. Various slurry stabilizers and polymer stabilizers may be added at this point, and the polymer is then recovered by a straining operation followed by a drying and milling operation which prepare the polymer in the form of slabs of coherent material suitable for packaging.

As so prepared, the polymer preferably has a Staudinger molecular weight number within the range between about 20,000 and about 100,000, preferably 45,000 to 65,000.

The commercial polymer usually has a Wijs iodine number between about 1 and 10, although for some special uses polymers having substantially higher iodine numbers can be produced. The commercial polymer usually has a molecular unsaturation, that is, a percentage of copolymerized multi-olefin, within the range between about 0.3% and about 6%. The preferred range would be 0.5 to 1.5% measured by ozonolysis at 0° C. In any event, it will be understood that the polymer described above, as well as its method of preparation, are well known per se and that the foregoing description has been included herein principally for the sake of convenience.

The isobutylene-diolefin copolymers described above are characterized by their exceptionally high impermeability to gases and also by their resistance to oxidation and other chemical effects. Accordingly, its vulcanizates have found extensive use in the manufacture of inner tubes, gaskets, flexible hoses, linings and so forth. However, in tire curing bags, high-temperature gaskets and other high temperature uses the utility of the vulcanized isobutylene copolymers has been limited heretofore by their rapid tendency to undergo cure reversion or devulcanization. In the case of sulfur vulcanizates, the reversion mechanism presumably involves destruction of the disulfide linkage or sulfur bond which links two adjacent polymer molecules, probably by reaction thereof with hydrogen disulfide present in the hot vulcanizate. In this fashion the sulfur cross-link is converted into two mercaptan groups, and the degree of vulcanization is decreased correspondingly.

The present invention involves the prevention or retardation of the cure reversion and involves the use of certain metal oxides or peroxides, hereafter referred to generically as oxidic compounds, which liberate free oxygen at a suitable rate in the temperature range where reversion is most likely to occur. It is supposed that the liberated oxygen reacts with the mercaptan groups and re-establishes the sulfur cross-link, thereby restoring the original state of cure. However, claim to the present invention is not made dependent on the validity of the theoretical mechanism suggested herein.

Calcium peroxide, having a decomposition temperature of 275° C. has been found to be a particularly effective agent used for inhibiting reversion. Other oxidic compounds which have been found more or less effective for the purposes of this invention include:

| | Decomposition temperature, °C. |
|---|---|
| Lead dioxide, O=Pb=O | 290 |
| Manganese dioxide, O=Mn=O | 565 (approx.) |
| Strontium peroxide, Sr$\langle{}^O_O$ | 376–430 (approx.) |

Accordingly it appears that, to be suitable for the purposes of this invention, the oxidic metal compounds should contain 2 oxygen atoms, either as a dioxide or a peroxide, and liberate oxygen at a proper rate in the presence of mercaptans in the temperature range between 200 and 600° C., preferably between 260 and 350° C.

On the other hand, organic peroxides and magnesium peroxide are not useful because they decompose too readily, whereas barium peroxide and oxides of nickel, cobalt and iron and the like do not decompose in the specified range, or else they react with the mercaptans too slowly to be effective. Other inorganic oxidizing agents in classes represented by sodium hypochlorite, potassium persulfate and potassium chlorate are not only ineffective, but their excessive oxidizing power has proven deleterious to the polymer network.

In practicing the invention, 1 to 35, or preferably 5 to 20 parts by weight of the oxidic reversion inhibitor are incorporated into 100 parts by weight of the isobutylene-diolefin polymer along with the usual compounding and vulcanizing agents prior to curing. For example, a typical compounding recipe may consist of the following:

Isobutylene-diolefin copolymer, 100 parts, preferably 100 parts
Zinc oxide, 0 to 10 parts, preferably 3 to 8 parts
Sulfur, 0 to 10 parts, preferably 1 to 5 parts
Vulcanization accelerator, 0 to 5 parts, preferably 0.5 to 3 parts
Carbon black, 0 to 100 parts, preferably 0 to 100 parts.
Oxidic compound, 1 to 35 parts, preferably 5 to 20 parts Suitable vulcanization accelerators include low molecular weight alkyl thiuram disulfides such as tetra-methyl thiuram disulfide; mercaptobenzothiazole; benzothiazyl disulfide; N-cyclohexyl-2-benzothiazole sulfenamide; and the like. It will be understood that conventional pigments, fillers or reinforcing agents such as carbon black, plasticizers, stearic acid, and other conventional compounding ingredients may also be present.

The essence of the invention depends on the additional presence of the oxidic compound in the vulcanizate, and particularly on its effect on the reduction of the characteristic disulfide linkage, however obtained, and does not depend on the particular compounding recipe or curing conditions used. For instance, the invention is applicable even in conjunction with curing formulas containing no elemental sulfur, but employing other known sulfur-containing agents which vulcanize the polymer by means of disulfide cross-links. Both elemental sulfur and the sulfur-containing agents will be referred to hereafter generically as sulfur of vulcanization. Also, it is immaterial to the present invention whether the polymer is cured at low temperature, e. g. for 5 hours at 100° C., or at high temperature, e. g. for 1 minute at 225° C. Ordinarily, the polymer is cured for 5 to 30 minutes at 150 to 200° C.

EXAMPLE 1

GR-I compounds were prepared according to the following recipes:

| | Control—I | Invention |
|---|---|---|
| GR-I (copolymer of about 97.5% isobutylene, 2.5% isoprene) | 100 | 100 |
| ZnO | 5 | 5 |
| Sulfur | 2 | 2 |
| Tetramethyl thiuram disulfide | 1 | 1 |
| CaO$_2$ | | 8 |

The compounds were prepared on a double roll mill. Appropriate portions of each compound were then cured simultaneously under the conditions stated in Table I below. Samples of the resulting vulcanizates were then swollen in cyclohexane at 25° C. to obtain an indication of the state of vulcanization. The amount of mercaptan sulfur was also determined by standard methods applicable to petroleum oils, as described in Industrial & Engineering Chemistry, Analytical Ed., vol. 1, 186 (1929) and ibid., vol. 7, 86 (1935). The results are summarized in Table I.

*Table I*

| Cure | Control—I | | | Invention | | |
|---|---|---|---|---|---|---|
| | Vol. swell (Percent based on polymer) | Modulus at 50% ext.[1] | Mercaptan sulfur, percent | Vol. swell (Percent based on polymer) | Modulus at 50% ext.[1] | Mercaptan sulfur, percent |
| 177° C. | | Lbs./sq. in. | | | Lbs./sq. in. | |
| 1 min | 1,250 | | | 1,500 | | |
| 2 min | 700 | 15 | | 740 | 16 | |
| 4 min | 560 | 22 | | 560 | 22 | |
| 10 min | 510 | 23 | 0.14 | 490 | 29 | 0.13 |
| 20 min | 540 | 24 | | 490 | 24 | |
| 40 min | 710 | 18 | | 600 | 20 | |
| 80 min | 1,500 | 4 | 0.54 | 740 | 15 | 0.26 |
| 205° C. | | | | | | |
| 20 secs | 800 | 11 | | 940 | 8 | |
| 30 secs | 700 | 15 | | 760 | 13 | |
| 1 min | 580 | 20 | | 620 | 18 | |
| 2 min | 540 | 25 | | 540 | 22 | |
| 4 min | 560 | 24 | | 540 | 22 | |
| 8 min | 800 | 13 | | 700 | 16 | |
| 15 min | 1,900 | 3 | | 1,490 | 12 | |

[1] Equilibrium elastic modulus.

The above results indicate that both the control and the compound stabilized with calcium peroxide have an optimum cure of about 10 minutes at 177° C. and about 2 minutes at 205° C. But whereas vulcanization times in excess of the optimum rapidly cause reversion to take place in the control compound, the stabilized compound of the invention is relatively insensitive to considerable overcuring. The reversion tendency of the control compound is illustrated by the solvent swell, which equals 1500% for the sample cured for eighty minutes at 177° C. as opposed to 510% at optimum cure. The reversion is also clearly reflected in the mercaptan sulfur content which has risen to 0.54% for the 80-minute cure as opposed to 0.14% at optimum cure. Moreover, the reversion can be seen to have had a profoundly adverse effect on the elastic modulus of the control sample. In contrast, the comparative changes in the compounds stabilized in accordance with the present invention are quite significantly lower, illustrating the very substantial increase in resistance to heat obtainable by the presence of the peroxide. Incidentally, it is interesting to observe that the proportionate changes in mercaptan sulfur content are in good agreement with the corresponding changes in degree of swell.

EXAMPLE 2

Batches were compounded on a rubber mill according to the formulas shown in Table II. Samples of each compound were simultaneously cured by heating in a press at 177° C. for varying periods and the volume swell of each sample in cyclohexane at 25° C. was determined. The comparative effect of the various oxides as reversion inhibitors is illustrated by the data shown below.

*Table II*

| Compound | Formula (parts by weight) | | | | |
|---|---|---|---|---|---|
| | Control—II | No. 1 | No. 2 | No. 3 | No. 4 |
| GR-I | 100 | 100 | 100 | 100 | 100 |
| Zinc oxide | 5 | 5 | 5 | 5 | 5 |
| Sulfur | 2 | 2 | 2 | 2 | 2 |
| Tetramethyl thiuram disulfide | 1 | 1 | 1 | 1 | 1 |
| CaO₂ | | 8 | | | |
| PbO₂ | | | 8 | | |
| MnO₂ | | | | 8 | |
| SrO₂ | | | | | 8 |

| Vulcanizate | Percent volume swell of vulcanizate | | | | |
|---|---|---|---|---|---|
| | Control—II | No. 1 | No. 2 | No. 3 | No. 4 |
| Time of cure, min. (at 177° C.): | | | | | |
| 5 | 520 | 510 | 550 | 460 | 500 |
| 10 | 530 | 460 | 480 | 430 | 490 |
| 20 | 480 | 490 | 470 | 460 | 490 |
| 40 | 640 | 560 | 620 | 590 | 640 |
| 80 | 1,290 | 930 | 860 | 790 | 1,080 |

The above data show that, after prolonged exposure to high temperatures, GR-I vulcanizates containing calcium peroxide, lead dioxide or manganese dioxide are much more resistant to cyclohexane than is the control vulcanizate containing no oxygen-liberating oxide. This difference in resistance to solvent reflects the respective states of cure, i. e., under the action of heat the control vulcanizate undergoes reversion to a far more harmful extent than the vulcanizates stabilized in accordance with this invention. Strontium peroxide, having a decomposition temperature intermediate to that of calcium peroxide and manganese dioxide, also is seen to decrease favorably the reversion tendency of the vulcanizate, but to a smaller degree than any of the other oxides tested in this example. This indicates that the decomposition temperature is not the sole factor governing the effectiveness of the oxide for the purposes of the invention, but apparently the effectiveness further depends on the rate with which the oxide is chemically reduced by mercaptans or the like at the elevated temperature. In fact, manganese dioxide seems highly effective in promoting vulcanization positively even before the setting in of reversion, and at temperatures substantially below its thermal decomposition point.

EXAMPLE 3

In another test the compounds identified in Table III below were prepared and cured, and their resistance to cyclohexane determined by the procedure described earlier herein.

*Table III*

| Compound | Formula (parts by weight) | | |
|---|---|---|---|
| | Control—III | No. 5 | No. 6 |
| GR-I | 100 | 100 | 100 |
| Zinc oxide | 5 | 5 | 5 |
| Tetramethyl thiuram disulfide | 1 | 1 | 1 |
| Sulfur | 2 | 2 | 2 |
| BaO₂ | | 10 | |
| SrO₂ | | | 10 |

Table III—Continued

| Vulcanizate | Percent volume swell of vulcanizate | | |
|---|---|---|---|
| | Control—III | No. 5 | No. 6 |
| Time of cure, min. (at 177° C.): | | | |
| 4 | 550 | 540 | 520 |
| 10 | 500 | 450 | 460 |
| 20 | 490 | 480 | 480 |
| 40 | 600 | 590 | 640 |
| 80 | 1,060 | 1,030 | 800 |

It is apparent that barium peroxide is too stable to be effective in retarding conversion whereas strontium peroxide did bring about a moderate improvement.

EXAMPLE 4

Magnesium peroxide is the least stable of the metallic peroxides tried and consequently was not effective in retarding reversion. This is attributed to its more "explosive" action which would waste oxygen. It is also available only as 15% $MgO_2$ in admixture with $Mg(OH)_2$. Because of this dilution a series of loading experiments were conducted whereby the effectiveness of increasing quantities of 15% $MgO_2$ on reversion retardation were observed. A portion of the data is tabulated below:

Table IV

| Compound | Control—IV | No. 7 | No. 8 | No. 9 |
|---|---|---|---|---|
| GR-I | 100 | 100 | 100 | 100 |
| Zinc oxide | 5 | 5 | 5 | 5 |
| Tetramethyl thiuram disulfide | 1 | 1 | 1 | 1 |
| Sulfur | 2 | 2 | 2 | 2 |
| 15% $MgO_2$ | | 2 | 8 | 32 |

| Vulcanizate | Control—IV | No. 11 | No. 12 | No. 13 |
|---|---|---|---|---|
| Time of cure, min. at 177° C.: | | | | |
| 10 | 495 | 510 | 485 | 470 |
| 20 | 510 | 530 | 495 | 470 |
| 40 | 630 | 580 | 540 | 550 |
| 80 | 915 | 880 | 880 | 850 |
| Time of cure, min. at 205° C.: | | | | |
| 2 | 550 | | 560 | 520 |
| 4 | 275 | | 550 | 590 |
| 8 | 730 | | 690 | 810 |
| 15 | 1,120 | | 1,260 | 1,380 |

The tabulated data show that magnesium peroxide retards reversion to a negligible degree, if at all, and that its effectiveness is not increased appreciably by an increase in concentration.

EXAMPLE 5

As regards the extent of peroxide concentration which is effective, a loading study reaching up to 32 parts of calcium peroxide per 100 parts of GR–I polymer still yielded positive retardation of reversion as shown below.

Table V

| Compound | Control—V | No. 10 |
|---|---|---|
| GR-I | 100 | 100 |
| Zinc oxide | 5 | 5 |
| Sulfur | 2 | 2 |
| Tuads | 1 | 1 |
| $CaO_2$ | | 32 |

| Time of cure, min. at 177° C | Percent volume swell | |
|---|---|---|
| | Control—V | No. 10 |
| 10 | 475 | 480 |
| 80 | 1,130 | 860 |

The volume swell for the high concentration of $CaO_2$ was adjusted for the peroxide content; the volume swell represents the swell based on the volume of hydrocarbon polymer alone, exclusive of peroxide.

It will be noted that a control was run with each series of compounds of the several examples. This was done to compensate for minor differences in polymer as well as slight variations in mixing and vulcanization conditions. Thus, while the controls may differ slightly from each other, within each example the data obtained on the several compounds are strictly comparable. Also, unless otherwise indicated, every reference to "parts" will be understood throughout this specification and the appended claims as a reference to "parts by weight."

It should also be noted that the present invention is applicable only to low-unsaturation polymers such as GR–I, since these polymers possess a structure which is characteristically resistant to oxidative effects. In contrast, highly unsaturated diene type rubbers undergo cyclization and cross-linking on heating, and the action of oxygen only accelerates these undesirable reactions, causing a hardening of the vulcanizate. Thus, while the presence of agents such as calcium peroxide in the vulcanization formulas for natural rubber or for synthetic polymers of the emulsion type such as GR–S or GR–A contributes to a definite reduction in swelling capacity of vulcanizates heated for prolonged periods, this is due primarily to increased oxidation or cyclization of the polymer itself rather than to any retardation of the reversion. Since such cyclization is tantamount to a hardening of the polymer and a resultant loss of flex life and normal elongation, and since any oxidizing agent merely accelerates the hardening, the addition of the oxidic compounds of the invention to highly unsaturated rubbers is actually harmful.

The foregoing specification describes the invention which relates to the stabilization of vulcanized low-unsaturation polymers against heat deterioration involving a reversion in the degree of cure; and the invention has been illustrated by a number of specific examples. But it will be understood that numerous other embodiments are possible without departing from the inventive concept disclosed herein and that the scope of the claimed invention is not limited to the disclosed examples but is defined in the appended claims.

I claim:

1. A composition of matter comprising 100 parts of a solid, rubber-like copolymer of a major proportion of combined isobutylene and a minor proportion of a combined diolefin having 4 to 6 carbon atoms per molecule, curing agents consisting only of disulfide cross-link forming curing compounds including 0.5 to 10 parts of sulfur of vulcanization and about 5 to 8 parts of an oxidic metal compound containing 2 oxygen atoms per metal atom and having a decomposition temperature between 250 and 350° C., to stabilize the composition, after vulcanization, against cure reversion at high temperature.

2. A vulcanized composition of matter comprising 100 parts of a solid, rubber-like copolymer of 94 to 98.5% of combined isobutylene and 6 to 1.5% of a combined conjugated diolefin having 4 to 5 carbon atoms per molecule, 3 to 8 parts of zinc oxide, the vulcanizing having been effected solely by 0.1 to 2 parts of sulfur in the form of disulfide cross-links and 0.5 to 3 parts of a disulfide cross-link forming vulcanization accelerator, 0 to 100 parts of carbon black and 5 to about 8 parts of an oxidic metal compound selected from the group consisting of calcium peroxide, strontium peroxide, lead dioxide and manganese dioxide, the amount of said metal oxide being sufficient to stabilize the composition, after vulcanization, against cure reversion at high temperature, as measured by solvent swelling and mercaptan sulfur content.

3. A composition of matter comprising 100 parts of a solid, rubber-like copolymer having a Staudinger molecular weight between 20,000 and 100,000 and composed of 94 to 99.7% of combined isobutylene and 6 to 0.3% of combined isoprene, 3 to 8 parts of zinc oxide, 1 to 5 parts of elemental sulfur, curing accelerator agents consisting only of 0.5 to 3 parts of a sulfur-containing vulcanization accelerator and 5 to 20 parts of calcium peroxide, the amount of said metal oxide being sufficient to stabilize the composition, after vulcanization, against cure reversion at high temperature, as measured by solvent swelling and mercaptan sulfur content.

4. A vulcanized composition of matter consisting of 100 parts of a solid, rubber-like copolymer of 97.5% combined isobutylene and 2.5% combined isoprene, 5 parts of zinc oxide, curing agents consisting only of 1 part of tetramethyl thiuram disulfide, 2 parts of sulfur and 8 parts of calcium peroxide.

5. In the process of vulcanizing a rubber-like compound comprising 100 parts of a copolymer of a major proportion of combined isobutylene and a minor proportion of a combined $C_4$ to $C_6$ conjugated diolefin in the presence of curing agents consisting only of disulfide cross-link forming curing compounds containing 1 to 5 parts of sulfur of vulcanization at a temperature between 100 and 210° C., the improvement which consists of adding to the compound, prior to vulcanization, 5 to about 8 parts of metal oxide having 2 oxygen atoms per metal atom and having a decomposition temperature between 250 and 600° C.

6. A process according to claim 5 wherein the metal oxide is calcium peroxide.

7. A process according to claim 5 wherein the metal oxide is manganese dioxide.

8. In a process of vulcanizing a rubber-like compound comprising 100 parts of a copolymer having a Staudinger molecular weight between 20,000 and 65,000 and composed of 94 to 99.7% combined isobutylene and 6 to 0.3% combined isoprene in the presence of 3 to 8 parts of zinc oxide, curing agents consisting only of 0.5 to 3 parts of tetramethyl thiuram disulfide and 1 to 5 parts of sulfur by heating for 5 to 30 minutes at 150 to 200° C., the improvement which consists of mixing into the compound 5 to 20 parts of calcium peroxide, the amount of said metal oxide being sufficient to stabilize the composition, after vulcanization, against cure reversion at high temperature, as measured by solvent swelling and mercaptan sulfur content.

ROBERT L. ZAPP.

References Cited in the file of this patent

UNITED STATES PATENTS

| Number | Name | Date |
|---|---|---|
| 2,170,191 | Fisher | Aug. 22, 1939 |
| 2,391,742 | Roberts | Dec. 25, 1945 |
| 2,445,283 | Sterrett | July 13, 1948 |